(12) United States Patent
Hu et al.

(10) Patent No.: US 11,086,197 B1
(45) Date of Patent: Aug. 10, 2021

(54) PHOTOGRAPHING SYSTEM AND METHOD OF PHOTOGRAPHING HUMAN

(71) Applicants: Yongtong Hu, Falls Church, VA (US); David Hu, Falls Church, VA (US)

(72) Inventors: Yongtong Hu, Falls Church, VA (US); David Hu, Falls Church, VA (US)

(*) Notice: Subject to any disclaimer, the term of this patent is extended or adjusted under 35 U.S.C. 154(b) by 0 days.

(21) Appl. No.: 17/005,453

(22) Filed: Aug. 28, 2020

(51) Int. Cl.
| | |
|---|---|
| *H04N 9/47* | (2006.01) |
| *G03B 15/00* | (2021.01) |
| *H04N 5/225* | (2006.01) |
| *G03B 17/56* | (2021.01) |
| *H04N 5/232* | (2006.01) |
| *G02B 27/14* | (2006.01) |
| *H04N 5/262* | (2006.01) |
| *H04N 5/77* | (2006.01) |

(52) U.S. Cl.
CPC .......... *G03B 15/00* (2013.01); *G02B 27/144* (2013.01); *G03B 17/561* (2013.01); *H04N 5/2253* (2013.01); *H04N 5/23293* (2013.01); *H04N 5/2628* (2013.01)

(58) Field of Classification Search
CPC .... G03B 15/00; G03B 17/561; H04N 5/2253; H04N 5/23293; H04N 5/2628; G02B 27/144

USPC .......... 348/77, 64, 73, 76, 61; 386/224, 227
See application file for complete search history.

(56) References Cited

U.S. PATENT DOCUMENTS

| | | | |
|---|---|---|---|
| 2014/0333734 A1* | 11/2014 | Yang | H04N 13/363 348/53 |
| 2016/0280136 A1* | 9/2016 | Besson | B60R 1/00 |
| 2017/0313252 A1* | 11/2017 | Uchimura | H03K 17/941 |

* cited by examiner

*Primary Examiner* — Robert Chevalier
(74) *Attorney, Agent, or Firm* — Xsensus LLP

(57) ABSTRACT

The present invention relates to a photographing system. The photographing system may include a photographing device having a lens for capturing image data of a human; a display panel having a screen configured to display the image data of the human; and a semi-transparent mirror disposed between the human and the photographing device and at an angle to the screen of the display panel. The photographing device may capture the image data of the human through the semi-transparent mirror. The semi-transparent mirror may be disposed to reflect the image data of the human on the screen of the display panel so that a reflection of the image data of the human appears on the semi-transparent mirror.

20 Claims, 3 Drawing Sheets

PHOTOGRAPHING SYSTEM AND METHOD OF PHOTOGRAPHING HUMAN

FIELD OF THE INVENTION

The present invention relates to photographing, and more particularly, to a photographing system and a method of photographing a human using the photographing system

BACKGROUND

Posing human for portrait photography is tricky, especially when you want that natural look. When people are being photographed, some tend to look up when a camera is pointed at them. They become stiff, their expressions change and they are unsure where to look. Their hands show their nervousness, and they often become fidgety and uncomfortable. Because people usually cannot see themselves during the photographing, it is difficult for them to adjust their poses or face expression accordingly.

BRIEF SUMMARY

One example of the present invention is a photographing system. The photographing system may include a photographing device having a lens for capturing image data of a human; a display panel having a screen configured to display the image data of the human captured by the photographing device; a semi-transparent mirror disposed between the human and the photographing device and at an angle to the screen of the display panel. The photographing device may capture the image data of the human through the semi-transparent mirror. The semi-transparent mirror may be disposed to reflect the image data of the human on the display panel so that a reflection of the image data of the human appears on the semi-transparent mirror. As such, the human in front of the photographing device can see himself/herself while still appearing as if he/she is looking at the photographing device in the final image or video. Consequently, the human can adjust his or her pose or face expression while observing himself or herself during the photographing.

Another example of the present invention is a method of photographing a human using a photographing system. The photographing system may include a photographing device having a lens, a display panel having a screen, and a semi-transparent mirror disposed between the human and the photographing device and at an angle to the screen of the display panel. The method may include displaying image data on the screen of the display panel so that the semi-transparent mirror reflects the image data on the display panel for viewing by the human a reflection of the image data appearing on the semi-transparent mirror. As such, the human is capable of adjusting his or her pose or facial expression in response to the reflection of the image data appearing on the semi-transparent mirror. The method may further include capturing a final image data of the human by the photographing device. According to the method of the present invention, the human in front of the photographing device can view the content on the display panel while still appearing as if he/she is looking at the photographing device in the final image or video. The content on the display panel may be himself or herself, or some content such as a funny video to naturally trigger certain pose or facial expression on the human.

BRIEF DESCRIPTION OF THE DRAWINGS

The drawings are intended to provide a further understanding of the technical solutions of the present disclosure, and are intended to be a part of the specification, and are used to explain the technical solutions of the present disclosure, and do not constitute a limitation of the technical solutions of the present disclosure.

The aspects and advantages of the present disclosure will become obvious and easy to understand from the following description of the embodiments in conjunction with the drawings.

DETAILED DESCRIPTION

Figure 1:
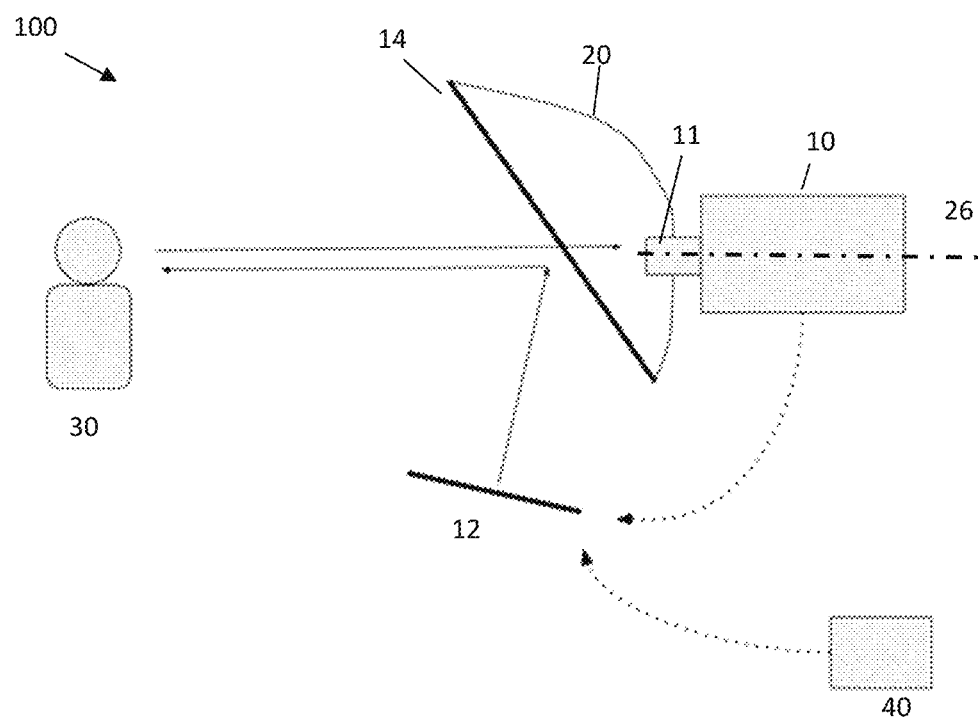
FIG. 1 is a schematic diagram of a photographing system according to one embodiment of the present disclosure.

The present invention is described with reference to embodiments of the invention in order to provide a better understanding by those skilled in the art of the technical solutions of the present disclosure.

The present disclosure is described in detail below, and examples of embodiments of the present disclosure are illustrated in the accompanying drawings, wherein the same or similar reference numerals refer to the same or similar components or components having the same or similar functions. Furthermore, if a detailed description of a known technique is unnecessary for the features of the present application shown, it will be not described herein. The embodiments described below with reference to the accompanying drawings are intended to be illustrative only, and are not to be construed as a limitation of the present disclosure.

Those skilled in the art will appreciate that all terms (including technical and scientific terms) used herein have the same meaning as commonly understood by one of ordinary skill in the art to which this disclosure belongs, unless otherwise defined. It should also be understood that those terms, as defined in a general dictionary, should be understood as having the meaning consistent with the meaning in the context of the prior art and should not be interpreted with idealized or overly formal meaning unless they were specifically defined herein.

It should be understood that the singular forms "a," "an," and "the" may include plural forms. It should be further understood that the wording used in the specification of the present disclosure "include" refers to the presence of the features, integers, steps, operations, elements and/or components, but does not preclude the presence or addition of one or more other features, integers, steps, operations, components, components and/or their groups. It will be understood that when an element is referred to as being "connected" or "coupled" or "attached" to another element, it can be directly connected or coupled or attached to the other element, or there may also be intermediate elements. Further, "connected" or "coupled" as used herein may include a wireless connection or a wireless coupling, respectively.

A number modified by "about" herein means that the number can vary by 10% thereof. A numerical range modified by "about" herein means that the upper and lower limits of the numerical range can vary by 10% thereof.

When taking a portrait in front of a camera, many people find it challenging to pose or control their facial expressions. One of the reasons is that they cannot see themselves during the photographing. It is possible to use a mirror or external monitor, or use a camera with a flip screen, but when people look at the mirror or screen, they do not appear looking into the camera in the final image or video.

One example of the present invention is a photographing system. As shown in FIG. 1, the photographing system 100 may include a photographing device 10 having a lens 11 for capturing image data of a human 30; a display panel 12 having a screen configured to display the image data of the human; and a semi-transparent mirror 14 disposed between the human and the photographing device 10 and at an angle to the screen of the display panel 12. The photographing device 10 may capture the image data of the human through the semi-transparent mirror 14. The semi-transparent mirror 14 may be disposed to reflect the image data of the human on the screen of the display panel 12 so that a reflection of the image data of the human may appear on the semi-transparent mirror 14. The human may be a person alone or among a group of people. As such, the human in front of the photographing device can see himself/herself while still appearing as if he/she is looking at the photographing device in the final image or video. Consequently, the human can adjust his or her pose or face expression while observing himself or herself during the photographing. The photographing device 10 may be a camera or camcorder or a cell phone device or a tablet containing a camera or camcorder. The image data of the human may be a still image or a video image of the human. The photographing system may be an image photographing system or a video photographing system The photographing device may be coupled or connected directly or indirectly to the display panel. The image data of the human may be transmitted from the photographing device to the screen of the display panel in a wired or wireless mode. The display panel may be any displaying device having a screen capable of displaying the image data of the human. For example, the display panel may be an external screen of the photographing device, a field monitor for the photographing device, a display monitor, a cell phone, or a tablet coupled to the photographing device.

The semi-transparent mirror of the present invention may be the same as a beam splitter. Those in the optical coating art will understand the vast variations possible for the semi-transparent mirror regarding its substrate, coating, and manufactured process. Both plastic and glass substrates, as well as stretched mylar, may be used for the semi-transparent mirror. The semi-transparent mirror may include a custom blend of optical coatings on a transparent substrate for superior reflectivity and transmissivity, or off-the-shelf one-way mirrors with good optical qualities. The reflectivity and transmissivity, as well as other optical qualities of the semi-transparent mirror, can be adjusted as required.

The semi-transparent mirror may have sufficient transparency to allow the photographing device such as a camera to capture a quality image of the human on the opposite side. The semi-transparent mirror may also be substantially reflective so that a quality image data of human is reflected from the screen of the display panel. In one embodiment, antireflective coatings may be applied as needed to suppress unwanted reflections from any of the optical surfaces involved. On the back side of the semi-transparent mirror, opposite from the viewing side, an antireflection coating can serve to eliminate the ghosting effect apparent with many types of semi-transparent mirrors.

The semi-transparent mirror may be positioned to form an angle of between about 30 degree to about 70 degree, preferably about 40 degree to about 60 degree, with the screen of the display panel. In one embodiment, the semi-transparent mirror is disposed at about 45 degree with a central axis of the lens, and the screen of the display panel is substantially parallel to the central axis of the lens. The central axis of the lens passes through the center of the lens vertically to the surface of the lens.

In one embodiment, a side of the semi-transparent mirror facing the photographing device and the lens of the photographing device may be disposed inside a housing or dark enclosure 20. In one embodiment, a housing or an enclosure 20 may wrap around the semi-transparent mirror 14 and the lens 11 of the photographing device, so that the lens 11 is in a dark environment where little light goes out.

In one embodiment, a display panel 12 such as a monitor screen is placed near the semi-transparent mirror and facing the semi-transparent mirror. The angle between the semi-transparent mirror and the screen of the display panel is adjusted so that the reflection of the screen of the display panel in the semi-transparent mirror is at about the same direction and position as the photographing device. As such, the human perceives the reflection of the image data of the human at substantially the same direction to the photographing device, and appears as if he or she is looking at the photographing device in the reflection of the image data of the human. In one embodiment, the acute angle between the semi-transparent mirror and the central axis of the lens 26 is about 45 degree, and the screen of the display panel may be substantially in parallel to the central axis of the lens.

Figure 2:
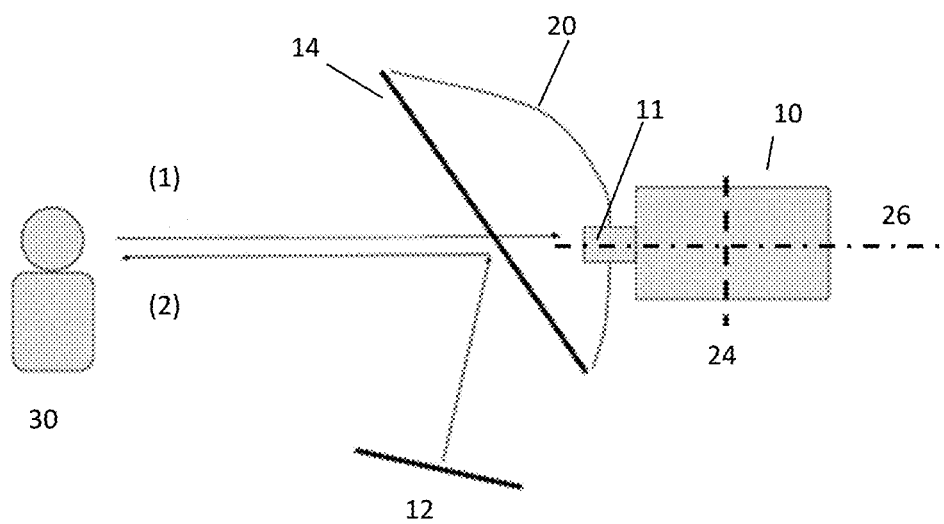
FIG. 2 is a schematic diagram of optical paths of a photographing system according to one embodiment of the present disclosure.

FIG. 2 is a schematic diagram of optical paths of a photographing system according to one embodiment of the present disclosure. Because of the nature of the semi-transparent mirror, the light beam that hits the semi-transparent mirror may be split into two parts. One part will go through the mirror as if it is a regular glass. The other part will be reflected as if it is a regular mirror. In this way, as shown in FIG. 2, the photographing device such as a camera can capture an image data of the human 30 through the semi-transparent mirror 14, shown as line (1) in FIG. 2. Because of the dark enclosure 20 around the lens 11 of the photographing device, there is almost little or no light coming from the photographing device to the human. Major light from the semi-transparent mirror 14 to the human 30 is the reflected light from the screen of the display panel 12, shown as line (2) in FIG. 2. What the human sees in the semi-transparent mirror is the reflection 24 of the screen of the display panel 12. In one embodiment, the screen of the display panel 12 includes the image data of the human transmitted from the photographing device. In another embodiment, the display panel is connected to another third image source, and the screen of the display panel includes some other content of image data transmitted from the third image source 40.

Figure 3:
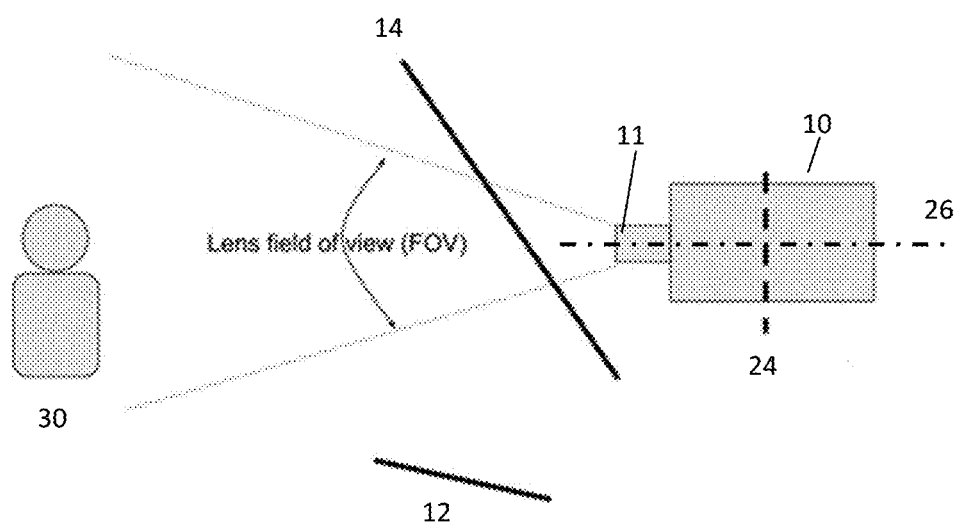
FIG. 3 is a schematic diagram of positional relationship of a semi-transparent mirror and a display panel of a photographing system according to one embodiment of the present disclosure.

FIG. 3 is a schematic diagram of positional relationship of a semi-transparent mirror and a screen of the display panel of a photographing system according to one embodiment of the present disclosure. The photographing device 10 may be a camera, camcorder, or a cell phone device or a tablet containing a camera or a camcorder. The photographing device 10 may include a lens 11. The human 30 may be at least partly or completely inside a field of view (FOV) of the lens 11 of the photographing device 10. The display panel 12 may be outside the FOV of the lens 11 of the photographing device 10.

In one embodiment, as shown in FIG. 3, the human stays in front of the photographing device, and inside the field of view (FOV) of the lens of the photographing device. The frame of the semi-transparent mirror may be large enough to not block any of the lens's FOV, unless the human does not mind that the frame shows up in the captured image data of the human by the photographing device.

In one embodiment, the display panel is placed outside the FOV of the lens, so that it's not visible to the camera. In another embodiment, the display panel is placed partly inside the FOV of the lens, so that it is visible to the camera. However, the display panel may be cropped out of the final image data in the post processing.

In one embodiment, the display panel and the semi-transparent mirror should be placed so that the reflection 24 of the screen of the display panel, indicated by the dash line in FIG. 3, is perceived substantially at the location and direction of the photographing device. The reflection 24 of the screen of the display panel may be perceived substantially parallel to the large surface of the lens. In one embodiment, the semi-transparent mirror is at about 45 degree related to the axis of the lens 26, and the screen of the display panel is horizontally placed and facing up. The semi-transparent mirror can tilt up, as long as the screen of the display panel can be adjusted so that the human in front of the photographing device can see him/herself while still appearing as if he/she is looking at the photographing device in the final image or video Changing the distance of the screen of the display panel and the semi-transparent mirror will change the distance of the reflection of the image data to the human. In one embodiment, the reflection of the image data is at the substantially same position as the photographing device such as a camera. In some applications, the reflection may be adjusted to be closer or further than the position of the photographing device.

The photographing system may further include a support structure. The photographing device, the display panel, and the semi-transparent mirror may be attached directly or indirectly on the support structure, thereby forming a hand-held apparatus. In one embodiment, the support structure is a column or a tripod.

In one embodiment, the display panel's settings may be set so that its output image is flipped horizontally and/or vertically from the input. For example, the photographing device is a camera, and the image in the display panel should be horizontally and/or vertically flipped, so that when the human looks at the reflection of the image data appearing on the semi-transparent mirror, he/she should see himself/herself as if the human is looking into a real ordinary mirror.

In one embodiment, the display panel or the photographing device such as a camera may have settings configured to flip the image data of the human horizontally and/or vertically so that the reflection of the image data of the human appears as a mirror image of the human. The settings for the flipping may be controlled using a software.

In one embodiment, the photographing system further includes an image flipping device, which is connected between the photographing device and the display panel. The image flipping device is configured to flip the image data of the human received from the photographing device horizontally and/or vertically and export the flipped image data to the display panel so that the reflection of the image data of the human appears as a mirror image of the human.

Another example of the present invention is a method of photographing a human using a photographing system. The photographing system may include a photographing device having a lens, a display panel having a screen, and a semi-transparent mirror disposed between the human and the photographing device and at an angle to the screen of the display panel. The method may include displaying image data on the display panel so that the semi-transparent mirror reflects the image data on the display panel and a reflection of the image data may appear on the semi-transparent mirror. As such, the human in front of the photographing device can view the content on the display panel while still appearing as if he/she is looking at the photographing device in the final image or video. Consequently, the human is capable of adjusting his or her pose or facial expression in response to the reflection of the image data appearing on the semi-transparent mirror. The content on the display panel may be himself or herself, or some content such as a funny video to naturally trigger certain pose or facial expression on the human. The method of photographing a human may further include capturing a final image data of the human by the photographing device.

In some embodiments of the present invention, the content on the screen of the display panel may be from the photographing device, so that the human can observe himself/herself during the photographing, and this helps posing. In some embodiments of the present invention, the content on the screen of the display panel can also display some content such as a funny video to naturally trigger certain pose or facial expressions of the human being photographed. This method may be used for cases, for example, which include self-portrait, young children portrait while mom can appear on the screen of the display panel. In one embodiment, the human is an infant looking at a reflection of the image data appearing on the semi-transparent mirror. Under the semi-transparent mirror is cell phone #1 in facetime mode, and mom in another location uses cell phone #2 to facetime with cell phone #1.

In one embodiment, before displaying the image data on the display panel, the method of photographing a human further includes capturing a preliminary image data of the human through the semi-transparent mirror by the photographing device; and transmitting live the preliminary image data of the human to the screen of the display panel so that the preliminary image data of the human constitutes the image data on the screen of the display panel. The preliminary image data of the human may be transmitted live from the photographing device to the display panel in a wired or wireless mode. The display panel may be any displaying device having a screen capable of displaying the image data of the human. For example, the display panel may be an external screen of the photographing device, a field monitor for the photographing device, a display monitor, a cell phone, or a tablet connected to the photographing device.

When the display panel is connected to the photographing device, the human sees himself/herself as if he/she is looking at a regular mirror during the photographing. More precisely, the human sees what the camera is taking, from the direction the camera is positioned. Since the camera is shooting through the semi-transparent mirror, the human appears looking at the camera in the final image or video. As such, the human in front of the photographing device can see him/herself while still appearing as if he/she is looking at the photographing device in the final image or video. This helps people to pose, because he/she can see him/herself in the final image, and make adjustments to the poses accordingly. It also helps people take selfies using cameras. That is, the person appears looking at the camera in the portrait image or video output, and at the same time, he/she is actually seeing himself/herself.

In one embodiment, the display panel may be connected to a third image source, and the image data on the screen of the display panel may be transmitted from the third image source in a wired or wireless mode. As such, the screen of the display panel can also show other content that helps the human get into a certain mood while taking pictures or shooting videos. For example, when taking photos of a baby, the mom's live video can be put on the monitor, then the baby can see his/her mom, and mom can make the baby smile. Alternatively, a puzzle may be displayed on the screen of the display panel, the human can watch the puzzle, and appears to be deep thinking in the final image. No matter what content to display, the human always looks like he or she is looking into the camera in the final photo or video. As such, the human in front of the photographing device can see the content on the screen of the display panel while still appearing as if he/she is looking at the photographing device in the final image or video. Consequently, the human is capable of adjusting his or her pose or facial expression in response to the reflection of the image data appearing on the semi-transparent mirror.

The principle and the embodiment of the disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

The invention claimed is:

1. A photographing system, comprising:
a photographing device having a lens for capturing image data of a human;
a display panel having a screen configured to display the image data of the human;
a semi-transparent mirror disposed between the human and the photographing device and at an angle to the screen of the display panel; the photographing device capturing the image data of the human through the semi-transparent mirror;
wherein the semi-transparent mirror is disposed to reflect the image data of the human on the screen of the display panel so that a reflection of the image data of the human appears on the semi-transparent mirror.

2. The photographing system of claim 1, wherein the image data of the human is transmitted from the photographing device to the screen of the display panel in a wired or wireless mode.

3. The photographing system of claim 1, wherein the display panel is an external screen of the photographing device, a field monitor for the photographing device, a display monitor, a cell phone, or a tablet.

4. The photographing system of claim 1, wherein the semi-transparent mirror is positioned to form an angle of between about 30 degree to about 70 degree with the screen of the display panel.

5. The photographing system of claim 1, wherein the semi-transparent mirror is disposed at about 45 degree with a central axis of the lens, and the screen of the display panel is substantially parallel to the central axis of the lens.

6. The photographing system of claim 1, wherein the human perceives the reflection of the image data of the human at substantially a same direction to the photographing device.

7. The photographing system of claim 1, wherein a side of the semi-transparent mirror facing the photographing device and the lens are disposed inside a housing or enclosure.

8. The photographing system of claim 1, wherein the human is at least partly inside a field of view of the lens of the photographing device.

9. The photographing system of claim 8, wherein the display panel is outside the field of view of the lens of the photographing device.

10. The photographing system of claim 1, wherein the photographing device is a camera, camcorder, or a cell phone device or a tablet containing a camera or camcorder.

11. The photographing system of claim 1, further comprising a support structure, wherein the photographing device, the display panel, and the semi-transparent mirror are attached on the support structure, thereby forming a handheld apparatus.

12. The photographing system of claim 1, wherein the support structure is a column or a tripod.

13. The photographing system of claim 1, wherein the display panel or the photographing device is configured to flip the image data of the human horizontally and/or vertically so that the reflection of the image data of the human appears as a mirror image of the human.

14. The photographing system of claim 1, further comprising an image flipping device between the photographing device and the display panel, wherein the flipping device is configured to flip the image data of the human received from the photographing device horizontally and/or vertically and export the flipped image data to the display panel so that the reflection of the image data of the human appears as a mirror image of the human.

15. A method of photographing a human using a photographing system, the photographing system comprising a photographing device having a lens, a display panel having a screen, and a semi-transparent mirror disposed between the human and the photographing device and at an angle to the screen of the display panel, the method comprising:
displaying image data on the screen of the display panel so that the semi-transparent mirror reflects the image data on the screen of the display panel and a reflection of the image data appears on the semi-transparent mirror so that the human is capable of adjusting his or her pose or facial expression in response to the reflection of the image data appearing on the semi-transparent mirror; and
capturing a final image data of the human by the photographing device.

16. The method of claim 15, before displaying the image data on the screen of the display panel, further comprising:
capturing a preliminary image data of the human through the semi-transparent mirror by the photographing device; and
transmitting live the preliminary image data of the human to the screen of the display panel so that the preliminary image data of the human constitutes the image data on the screen of the display panel.

17. The method of claim 16, wherein the preliminary image data of the human is transmitted live from the photographing device to the screen of the display panel in a wired or wireless mode.

18. The method of claim 16, wherein the display panel is an external screen of the photographing device, a field monitor for the photographing device, a display monitor, a cell phone, or a tablet.

19. The method of claim 15, wherein the display panel is connected to a third image source, and the image data on the display panel is transmitted from the third image source in a wired or wireless mode.

20. The method of claim 15, wherein the photographing device is a camera, camcorder, or a cell phone device or a tablet containing a camera or camcorder.

* * * * *